United States Patent
Amorin et al.

(10) Patent No.: US 6,631,954 B2
(45) Date of Patent: Oct. 14, 2003

(54) VEHICLE SEAT INCLUDING A PIVOTING BACK URGED FORWARDS BY A TORSION BAR

(75) Inventors: David Amorin, Amilly (FR); Yves Geoffroy, Les Bordes (FR)

(73) Assignee: Faurecia Siege d' Automobile S.A., Boulogne (FR)

(*) Notice: Subject to any disclaimer, the term of this patent is extended or adjusted under 35 U.S.C. 154(b) by 0 days.

(21) Appl. No.: 09/878,545

(22) Filed: Jun. 8, 2001

(65) Prior Publication Data

US 2001/0052722 A1 Dec. 20, 2001

(30) Foreign Application Priority Data

Jun. 16, 2000 (FR) .............................................. 00 07708

(51) Int. Cl.[7] .............................. B60N 2/02; A47C 3/00; F16F 1/14; F16F 1/06
(52) U.S. Cl. ................................ 297/378.1; 297/301.3; 297/291; 297/354.1; 267/154; 267/155; 267/273
(58) Field of Search ............................... 297/291, 301.3, 297/354.1, 354.12, 378.1, 378.11, 378.12, 452.18, 299; 267/154, 155, 273, 275

(56) References Cited

U.S. PATENT DOCUMENTS

| 4,132,447 A | * | 1/1979 | Terada ......................... 297/367 |
| 4,526,423 A | * | 7/1985 | Meinershagen et al. ..................... 248/188.91 |
| 4,923,181 A | * | 5/1990 | Streett .......................... 267/155 |
| 5,216,936 A | | 6/1993 | Baloche |
| 5,237,891 A | * | 8/1993 | Lundberg et al. .............. 74/560 |
| 5,397,167 A | | 3/1995 | Fourrey et al. |
| 5,464,197 A | * | 11/1995 | Ecclesfield ................... 267/155 |
| 5,951,108 A | * | 9/1999 | Bauer et al. .............. 297/354.1 |
| 5,979,980 A | * | 11/1999 | Amorin et al. ........... 297/218.3 |
| 6,422,547 B1 | * | 7/2002 | Gibbens ...................... 267/157 |

FOREIGN PATENT DOCUMENTS

| EP | 0 502 774 B1 | 9/1992 | |
| FR | 2 677 935 | 12/1992 | |
| FR | 2 687 354 | 8/1993 | |
| GB | 2 264 146 | 8/1993 | |
| JP | 58199233 A | * 11/1983 | ................. 297/341 |
| JP | 10-157500 | 10/1998 | |

OTHER PUBLICATIONS

Official Search Report of French Patent Office Concerning priority French Patent Application No. FR 000 7708; Report dated Feb. 28, 2001.

* cited by examiner

Primary Examiner—Peter M. Cuomo
Assistant Examiner—Sarah C. Burnham
(74) Attorney, Agent, or Firm—Marshall, Gerstein & Borun

(57) ABSTRACT

A vehicle seat has a back mounted to pivot on a seat proper by a locking mechanism, and urged forwards by a torsion bar formed by a metal wire which has two ends fixed respectively to the back and to the seat proper. The metal wire constituting the torsion bar forms at least one spiral comprising a plurality of adjacent turns.

8 Claims, 2 Drawing Sheets

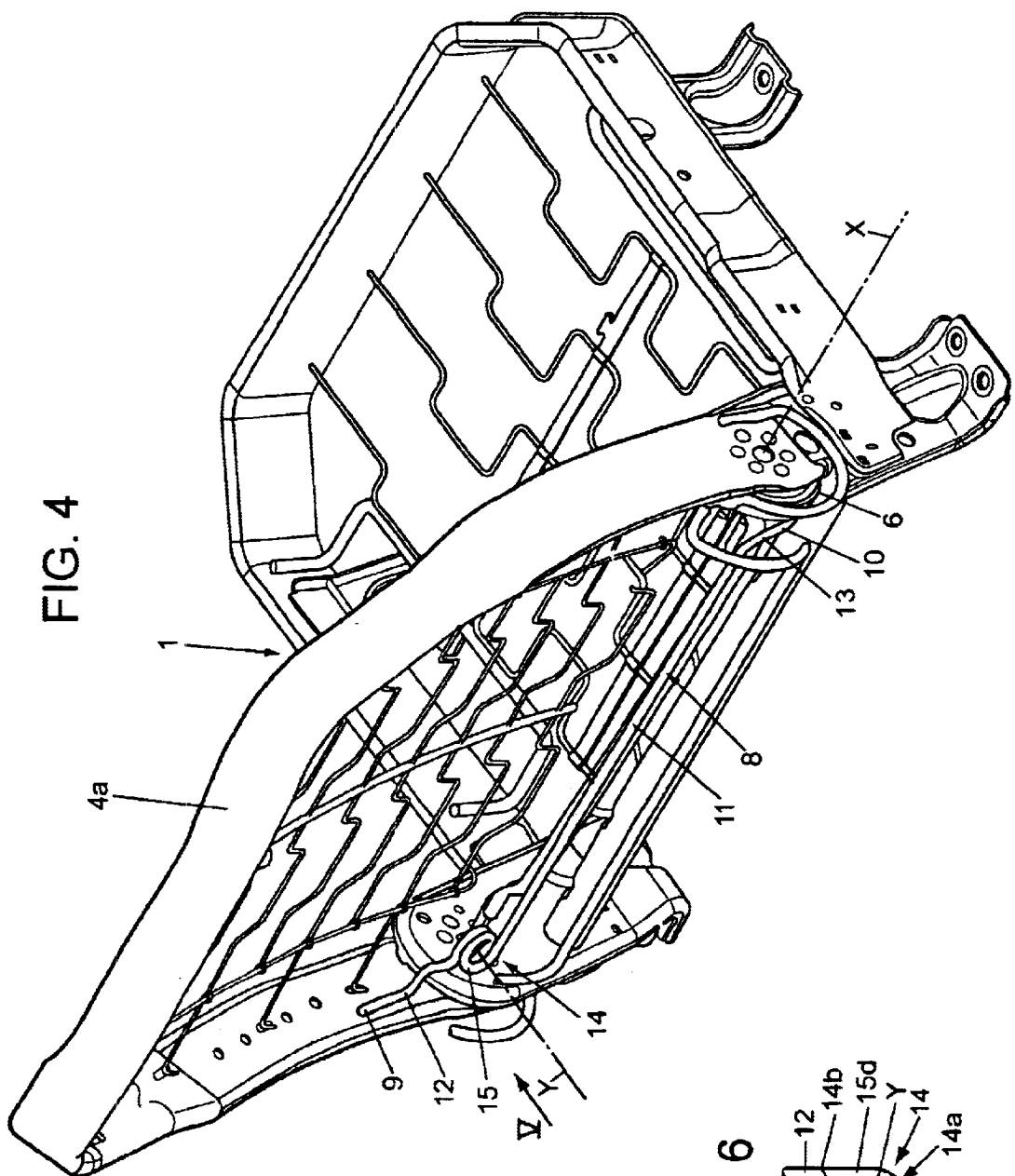

VEHICLE SEAT INCLUDING A PIVOTING BACK URGED FORWARDS BY A TORSION BAR

FIELD OF THE INVENTION

The present invention relates to a vehicle seat including a pivoting back that is urged forwards by a torsion bar.

More particularly, the invention provides a vehicle seat comprising two opposite sides, the seat including a back mounted on a seat proper to pivot about a transverse horizontal pivot axis by means of a locking mechanism that can be moved between a locked position in which said locking mechanism prevents the back from moving relative to the seat proper, and an unlocked position in which said locking mechanism leaves the back free to pivot relative to the seat proper about the pivot axis, the back being urged forwards by means of a torsion bar constituted by a metal wire which has two ends fixed respectively to the back and to the seat proper, at respective ones of the opposite sides of the seat.

BACKGROUND OF THE INVENTION

Document JP-A-10 157 500 describes an example of such a seat. Torsion bars of the kind used in the seat of that document nevertheless suffer from the drawback of producing satisfactory return torque only over a relatively small angular stroke for the back.

OBJECTS AND SUMMARY OF THE INVENTION

A particular object of the present invention is to mitigate that drawback.

To this end, the invention provides a seat of the kind in question which is characterized in that the metal wire constituting the torsion bar forms at least one spiral including a plurality of adjacent turns.

By means of these dispositions, the equivalent length of the torsion bar is increased, thereby enabling said torsion bar to produce satisfactory return torque over a wide range of angular positions of the seat back.

In preferred embodiments of the invention, one or more of the following dispositions may optionally be used:

- the torsion bar has a central portion extending substantially parallel to the pivot axis between first and second lever arms each extending in a general direction that is substantially perpendicular to the pivot axis, the spiral being formed between the central portion and the first lever arm, and said spiral having a central axis that is disposed perpendicularly to the central portion of the torsion bar and that is offset from said central portion of the torsion bar by a certain non-zero distance;
- the turns of the torsion bar all have the same diameter substantially equal to twice said offset distance between the central axis of the spiral and the central portion of the torsion bar;
- the spiral comprises:
    - a first turn which includes an initial portion extending upwards over 90° between a segment having a horizontal tangent disposed in line with the central portion of the torsion bar, and a segment having a vertical tangent; and
    - a last turn which includes an end portion extending upwards over 90° between a segment having a horizontal tangent and a segment having a substantially vertical tangent and disposed in line with the first lever arm;
- the spiral comprises a portion adjacent to the central portion of the torsion bar in which the turns touch one another, and a portion which is remote from said central portion of the torsion bar and in which the turns are spaced apart from one another;
- the spiral comprises three turns;
- the spiral presents a developed length lying in the range 30% to 62.5% of the length of the central portion of the torsion bar;
- the back is adapted to pivot relative to the seat proper over an angular stroke of magnitude lying in the range 120° to 180°;
- the back is adapted to pivot relative to the seat proper between a "table" position in which said back is folded down substantially horizontally over the seat proper, and a "bunk" position in which the back is tilted rearwards into a substantially horizontal position; and
- the metal wire is a steel wire presenting a diameter lying in the range 6 millimeters (mm) to 9 mm, the central portion of the torsion bar presenting a length lying in the range 40 centimeters (cm) to 50 cm, and the spiral presenting a developed length lying in the range 15 cm to 25 cm.

BRIEF DESCRIPTION OF THE DRAWINGS

Other characteristics and advantages of the invention will appear on reading the following description of embodiments given by way of a non-limiting example and with reference to the accompanying drawings.

In the drawings:

FIG. 4 is a perspective view of the framework of the seat of FIGS. 1 to 3; and

FIGS. 5 and 6 are detail views of the torsion bar fitted to the FIG. 4 seat, FIG. 5 being a view towards the front of the seat seen looking along arrow V in FIG. 4, and FIG. 6 being a view in the opposite direction.

MORE DETAILED DESCRIPTION

In the various figures, the same references are used to designate elements that are identical or similar.

Figure 1:
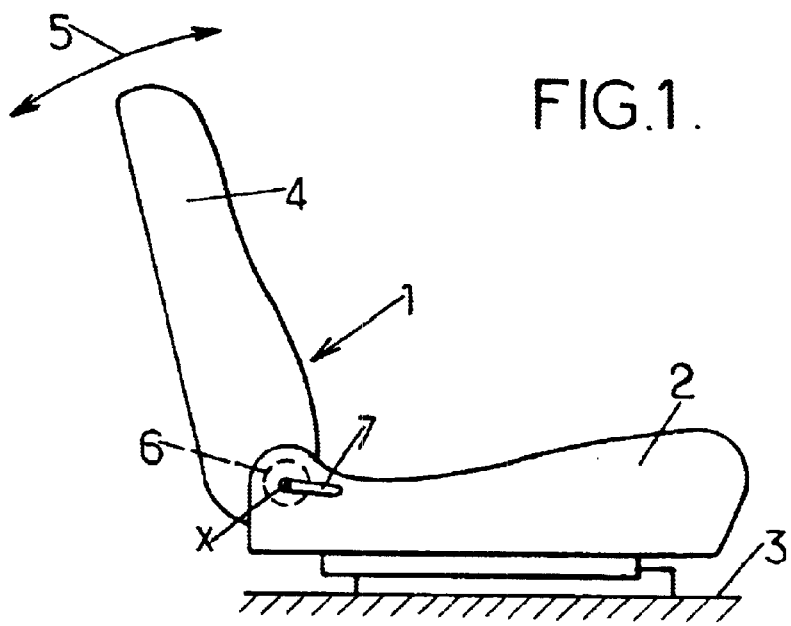
FIG. 1 is a diagrammatic view of a vehicle seat constituting an embodiment of the invention, in its normal, in-use position.

FIG. 1 shows a motor vehicle seat 1 comprising a seat proper 2 mounted on the vehicle floor 3, and supporting a seat back 4.

The back 4 is mounted to pivot in the directions of double-headed arrow 5 about a transverse horizontal axis X, by means of a locking mechanism 6 controlled by a handle 7.

The locking mechanism 6, which can, in particular, be of a type disclosed in document EP-A-0 502 774, is movable by means of the handle 7 between a locked position in which the locking mechanism 6 prevents the back 4 from pivoting relative to the seat proper 2, and an unlocked position in which said locking mechanism allows the back 4 to pivot freely relative to the seat proper 2.

It is thus possible to adjust the normal position for use of the back 4 by releasing the locking mechanism 6 by means of the handle 7, and by acting directly on the back 4, with the back being urged forwards by means of a torsion bar that is described below.

Figure 2:
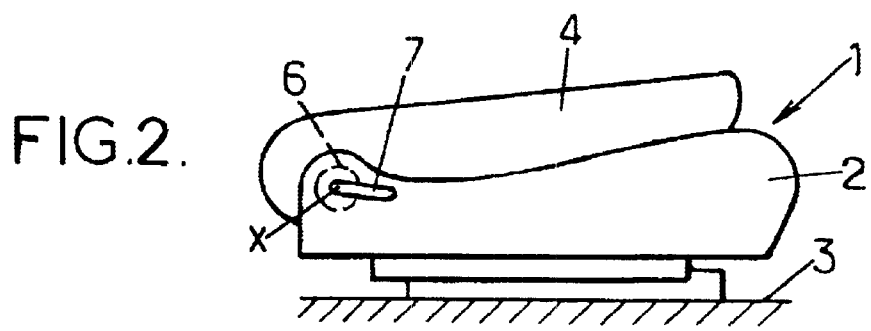
FIGS. 2 and 3 are views similar to FIG. 1, showing the seat in a "table" position and in a "bunk" position.

In addition, as shown in FIG. 2, it is possible to fold the back 4 down forwards until it overlies the seat proper 2, e.g. until it takes up a "table" position where the back 4 is disposed substantially horizontally.

Figure 3:
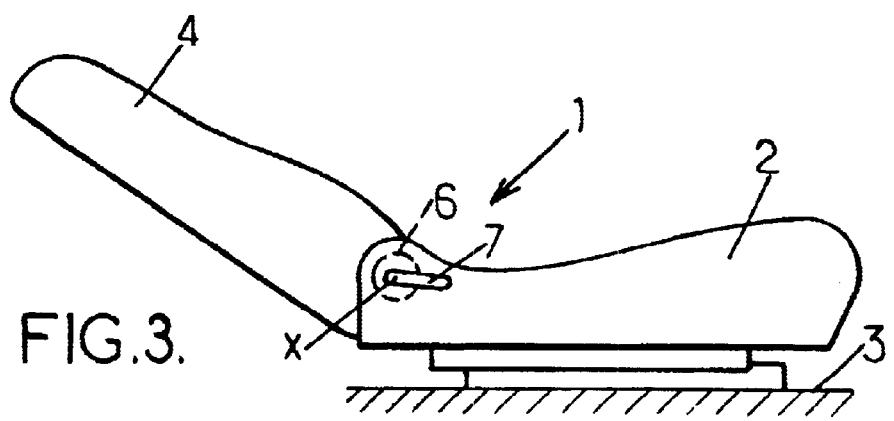

As shown in FIG. 3, it is possible to tilt the back 4 rearwards, e.g. until it reaches a "bunk" position in which the back 4 is substantially horizontal, extending the seat proper 2.

The back 4 can thus pivot relative to the seat proper 2 over an angular stroke whose magnitude lies in the range 120° to 180°, and said angular stroke can be about 150°, for example.

As can be seen in FIG. 4, the torsion bar 8 which urges the back resiliently forwards is constituted by a single metal wire, generally a steel wire, which extends between two ends 9 and 10 that are fixed rigidly respectively to the framework 4a of the seat back on one side of the seat, and to the framework 2a of the seat proper on the other side of the seat.

More precisely, the torsion bar 8 comprises a central portion 11 which extends substantially parallel to the pivot axis X over substantially the entire width of the seat, between two lever arms 12 and 13 each of which extends in a direction that is substantially perpendicular to the central portion 8 as far as the above-mentioned ends 9 and 10.

In addition, between the central portion 11 and the lever arm 12, the torsion bar 8 forms a spiral 14 comprising a plurality of successive turns 15 about an axis Y that is perpendicular to the axis X.

Advantageously, the turns 15 are disposed in such a manner as to act substantially as a traction spring when the seat back 4 is pivoted. More particularly, the turns 15 preferably move away from one another and towards one another in their portions 14b furthest from the central portion 11 of the torsion bar (see FIGS. 5 and 6), and they remain touching and touching the central portion 11 of the torsion bar in their portions 14a closest to said central portion 11 (in this case the bottom zones of the turns 15).

The axis Y of the turns 15 is preferably offset from the central portion 11 of the torsion bar, and in this example it is offset upwards. Advantageously, the offset is substantially equal to half the diameter D of the turns 15.

As shown in FIG. 5, the spiral 14 includes a first turn 15 which comprises an initial portion extending upwards over 90° between a segment 15a having a horizontal tangent and disposed in line with the central portion 11 of the torsion bar, and a segment 15b having a vertical tangent.

Similarly, the spiral 14 includes a last turn 15 that can be seen in FIG. 6 which comprises an end portion that extends upwards over 90° between a segment 15c having a horizontal tangent and a segment 15d having a substantially vertical tangent that is disposed in line with the bottom portion of the lever arm 12.

Advantageously, the spiral 14 can have a developed length lying in the range 30% to 62.5% of the length of the central portion 11 of the torsion bar.

In a particular embodiment, the metal wire constituting the torsion bar can have a diameter in the range 6 mm to 9 mm, the central portion 8 of the torsion bar having a length lying in the range 40 cm to 50 cm, and the spiral 14 presenting a developed length lying in the range 15 cm to 25 cm, which can make it possible, for example, to produce a return torque on the back 4 lying in the range 15 meter decanewtons (m.daN) to 20 m.daN, over an angular stroke of positions for the back 4 having a magnitude lying in the range 120° to 180°.

We claim:

1. A vehicle seat comprising two opposite sides, the seat including a back mounted on a seat proper to pivot about a transverse horizontal pivot axis by a locking mechanism that can be moved between a locked position in which said locking mechanism prevents the back from moving relative to the seat proper, and an unlocked position in which said locking mechanism leaves the back free to pivot relative to the seat proper about the pivot axis, the back being urged forwards by a torsion bar constituted by a metal wire which has two ends fixed respectively to the back and to the seat proper, at said opposite sides of the seat, wherein the metal wire constituting the torsion bar has a central portion extending substantially parallel to the pivot axis between first and second lever arms, each lever arm extending in a general direction that is substantially perpendicular to the pivot axis, from the central portion up to one of the ends of the torsion bar, said metal wire forming at least one spiral including a plurality of adjacent turns wound around a central axis on more than 360° between the central portion and the first lever arm, said central axis being disposed perpendicularly to the central portion of the torsion bar and being offset from said central portion of the torsion bar by a certain non-zero offset distance, the spiral comprising a portion adjacent to the central portion of the torsion bar in which the turns touch one another, and a portion which is remote from said central portion of the torsion bar and in which the turns are spaced apart from one another.

2. A seat according to claim 1, in which the turns of the torsion bar all have a same diameter substantially equal to twice said offset distance between the central axis of the spiral and the central portion of the torsion bar.

3. A seat according to claim 1, in which the spiral comprises:

a first turn which includes an initial portion extending upwards over 90° between a segment having a horizontal tangent disposed in line with the central portion of the torsion bar, and a segment having a vertical tangent; and a last turn which includes an end portion extending upwards over 90° between a segment having a horizontal tangent and a segment having a substantially vertical tangent and disposed in line with the first lever arm.

4. A seat according to claim 1, in which the spiral comprises three turns.

5. A seat according to claim 1, in which the central portion of the torsion bar has a certain length and the spiral presents a developed length lying in the range of 30% to 62.5% of the length of the central portion of the torsion bar.

6. A seat according to claim 1, in which the back is adapted to pivot relative to the seat proper over an angular stroke of magnitude lying in the range 120° to 180°.

7. A seat according to claim 6, in which the back is adapted to pivot relative to the seat proper between a "table" position in which said back is folded down substantially horizontally over the seat proper, and a "bunk" position in which the back is tilted rearwards into a substantially horizontal position.

8. A seat according to claim 1, in which the metal wire is a steel wire presenting a diameter lying in the range 6 mm to 9 mm, the central portion of the torsion bar presenting a length lying in the range 40 cm to 50 cm, and the spiral presenting a developed length lying in the range 15 cm to 25 cm.

* * * * *